United States Patent [19]

Modic

[11] Patent Number: 5,300,567
[45] Date of Patent: Apr. 5, 1994

[54] LOW TEMPERATURE TOUGHENING OF POLYESTERS WITH A MODIFIED BLOCK COPOLYMER

[75] Inventor: Michael J. Modic, Houston, Tex.

[73] Assignee: Shell Oil Company, Houston, Tex.

[21] Appl. No.: 998,206

[22] Filed: Dec. 30, 1992

[51] Int. Cl.$^5$ .............. C08L 51/00; C08L 51/04; C08L 53/00; C08G 63/127

[52] U.S. Cl. .............................. 525/64; 525/65; 525/69; 525/98

[58] Field of Search ................ 525/64, 65, 69, 98

[56] References Cited

U.S. PATENT DOCUMENTS

| | | |
|---|---|---|
| 4,172,859 | 10/1979 | Epstein . |
| 4,578,429 | 3/1986 | Gergen ............... 525/291 |
| 4,647,619 | 3/1987 | Dean . |
| 4,657,970 | 4/1987 | Shiraki .............. 525/57 |
| 4,657,971 | 4/1987 | Shiraki .............. 525/57 |
| 5,066,726 | 11/1991 | Modic . |

FOREIGN PATENT DOCUMENTS 211467 9/1987 European Pat. Off. .
61-126164 6/1986 Japan .

*Primary Examiner*—James J. Seidleck
*Assistant Examiner*—I. Zemel
*Attorney, Agent, or Firm*—Keith M. Tackett

[57] ABSTRACT

Toughened polyester compositions are obtained by blending from 60% to 90% by weight of a modified star block copolymer with from 10% to 40% by weight of a polybutylene terephthalate polyester. The modified star block copolymers are free-radically grafted with an effective amount of an epoxy containing compound such as glycidal acrylate or glycidal methacrylate to give a ductile composition having a ⅛ inch notched Izod impact strength of at least 10.0 ft-lb/in at −20° C.

8 Claims, No Drawings

LOW TEMPERATURE TOUGHENING OF POLYESTERS WITH A MODIFIED BLOCK COPOLYMER

FIELD OF THE INVENTION

This invention relates to a blends of polyesters with functionalized elastomers, specifically blends of polybutylene terephthalate with hydrogenated polymers of conjugated dienes.

BACKGROUND

Polyesters have excellent mechanical properties, but are relatively brittle at low temperatures. U.S. Pat. No. 4,657,971 discloses the use of modified, hydrogenated block copolymers of styrene and conjugated diolefins as impact modifiers for polymer blends containing polyesters. The block copolymers may be modified with a variety of acid groups or derivatives of the acid groups.

Blends of polybutylene terephthalate (PBT) polyester and modified elastomers were shown to have excellant room temperature properties in European Patent Application 211,467. However, the blends described in the reference do not have good impact strength at $-20°$ C. which precludes using the blends in automobiles and other items exposed to extreme cold temperatures.

SUMMARY OF THE INVENTION

It has been discovered that the low temperature impact strength of polybutylene terephthalate (PBT) polyester is significantly and unexpectedly improved by blending the polyester with a modified elastomer comprising a hydrogenated conjugated diene having a star configuration, a low polystyrene content, and grafted epoxy groups. The blends of the invention comprise from 60% to 90% of the PBT and exhibit ductile failure at $-20°$ C.

DETAILED DESCRIPTION OF THE INVENTION

The compositions of the invention comprise from 60% to 90%, preferably 70% to 85%, of a polybutylene terephthalate, and from 10% to 40%, preferably 15% to 30% of a modified elastomer having grafted epoxy groups. The compositions of the invention exhibit ductile failure during impact testing at $-20°$ C.

The modified elastomers having grafted epoxy groups are produced as described in U.S. Pat. No. 5,066,726 at column 3, line 3 to column 8, line 29, which description is incorporated by reference herein. The modified elastomers can be blended in any amount with any polyester such as polyethylene terephthalate or polybutylene terephthalate as stated in the '726 patent at column 1, lines 12-16. However, specific blends with polybutylene terephthalate were found to have significant and unexpected increases in low temperature impact strength as described below.

The polybutylene terephthalate (PBT) polyesters used in the preparation of blends of this invention have the general formula:

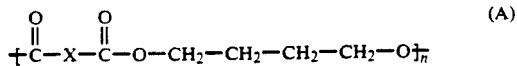
(A)

wherein n is sufficient to provide an engineering thermoplastic polymer and X comprises one or more phenylene or substituted phenylene groups. Preferably, X is non-substituted p-phenylene. The number average molecular weight of the PBT typically varies from 15,000 to 50,000, preferably from 25,000–50,000.

The preparation of PBT is well known and commercially available PBT is used in the examples. The conventional process is the condensation reaction of 1,4-butanediol and terephthalic acid or dimethylterephthalate. A suitable process for making the PBT is described in British patent specification 1,305,130.

Commercial sources of PBT include General Electric (VALOX ® thermoplastic polyester) and Hoechst-Celanese (CELANEX ® polyester).

The modified block copolymers are produced by free radical grafting of a selectively hydrogenated block copolymer having a specific structure with a compound comprising alpha-beta ethylenic unsaturation and at least one epoxy group. The grafted compound is preferably glycidal acrylate or glycidal methacrylate. The block copolymers prior to grafting comprise at least 95% by weight of a hydrogenated conjugated diene and a star structure represented by the formula:

(B)

wherein A is an optional block of styrene on one or more arms of the star structure, B is a block of hydrogenated conjugated diene, X is a block of a bisunsaturated coupling agent, and n is at least 10.

The hydrogenated conjugated diene blocks B have a residual unsaturation less than 10% and a peak molecular weight between 5,000 and 100,000, preferably between 15,000 and 50,000. The styrene blocks preferably have a peak molecular weight below 15,000 if present. The block of bisunsaturated coupling agent is generally less than 2% by weight of the polymer. The styrene blocks improve handling of the base polymer when present but do not enhance impact properties. Higher polystyrene content reduces the impact strength of the blends.

The preferred conjugated diene blocks are hydrogenated polybutadiene or hydrogenated polyisoprene. The hydrogenated polybutadiene or polyisoprene blocks preferably have a residual unsaturation less than 2%. The polymer is preferably hydrogenated as described in U.S. Pat. No. No. 27,145 which is incorporated by reference herein.

The bisunsaturated coupling agent has two polymerizable vinyl groups and is preferably divinylbenzene which is preferably added after polymerization of living polymers of the conjugated diene. A ratio of divinylbenzene to living polymer of 3:1 is preferred to accomplish an average of at least 10 polymeric arms per molecule as measured by gel permeation chromotagraphy in combination with a light scattering detector.

The epoxy compounds such as glycidal acrylate or glycidal methacrylate are grafted to the base block copolymer in an amount within the range from 1.0% to 10% by weight of the block copolymer, preferably from 1.5% to 5%. Lower levels of functionality are ineffective in improving the low temperature toughness of the polybutylene terephthalate.

The base block copolymer may be functionalized using the process of U.S. Pat. No. 5,066,726 or any of the free-radical grafting techniques known in the art for grafting functional groups to such polymers. For example, the modified, hydrogenated block copolymer may be prepared using solution processes such as those taught in U.S. Pat. Nos. 4,033,888; 4,077,893; and 4,670,173, which are incorporated herein by reference, or with melt-mixing processes such as those taught in U.S. Pat. Nos. 4,427,828; 4,578,429; and 4,628,072, which are incorporated herein by reference.

The compositions prepared according to the present invention may incorporate other components known in the art to be useful in polyester compositions. These other components include, for example, fillers, pigments, antioxidants, stabilizers, processing oils, extenders, mold release agents and the like.

When polybutylene terephthalate compositions are produced according to the present invention, the resultant compositions have an improved impact strength at −20° C. of at least 10 ft-lb/in and exhibit ductile failure during testing as shown in the following examples.

EXAMPLE

Polyester compositions were prepared by blending VALOX ® 310 polyester, a polybutylene terephthalate (PBT) polyester that is commercially available from General Electric Plastics and has a number average molecular weight of 32,500, with selected block copolymers having grafted glycidal acrylate or maleic anhydride. Example 1 illustrates the present invention and the remaining examples are presented for comparison.

EXAMPLE 1

A star hydrogenated isoprene block copolymer was conventionally prepared by polymerizing living polymeric arms of isoprene having a peak molecular weight of 35,000, coupling the arms with divinylbenzene, and hydrogenating the polymerized isoprene. The residual unsaturation of the star polymer was reduced to less than 2% of the original aliphatic unsaturation.

The star block copolymer was processed on a 25mm Berstorff co-rotating twin screw extruder connected to a vacuum devolatilization unit. Prior to addition to the feed throat of the extruder, the polymer was tumbled with 3.0% by weight of glycidal acrylate and 0.2% by weight of the peroxide (Lupersol 101). The melt temperature of the extruder was 223° C., and the extruder screw speed was 300 RPM.

To prepare the polymer for analysis, the modified block copolymer was dissolved in tetrahydrofuran, coagulated into isopropanol, and then washed with water. The modified polymer sample was analyzed for bound glycidal acrylate content. The modified star polymer was found to contain 2.4% by weight glycidal acrylate.

The modified block copolymer was blended at 20% by weight loading with PBT polyester (VALOX ® 310 polyester) in a 25mm Berstorff co-rotating twin screw extruder. The extruder screw speed was 300 RPM and the melt temperature reached was about 295° C. for the blend. Pellets from the resulting blend were injection molded into test specimens on a 25 ton/1.5 oz. Arburg injection molding machine. Each of the blends was tested for its impact strength (ASTM D-256) at room temperature (RT) and at low temperatures and tested for its flexural modulus (ASTM D-790). Table 1 gives the test results for comparing Example 1 of the present invention to the following comparison examples.

TABLE 1

| Sample ID | ⅛" Notched Izod (ft-lb/in).* | | | Flex Mod (psi) |
|---|---|---|---|---|
| | RT | −20° F. | −40° F. | |
| Example 1 | 20.2 | 14.4 | 4.4 | 255,000 |
| Example 2c | 3.9 | 1.2 | — | 205,000 |
| Example 3c | 19.8 | 3.2 | 3.0 | 275,000 |
| Example 4c | 15.6 | 2.4 | — | 267,000 |

*All samples having an impact strength above 14.0 ft-ib/in exhibited ductile failure.

EXAMPLE 2 (Comparison)

The star hydrogenated isoprene base polymer of Example 1 was grafted with maleic anhydride in a 2" WEI counter-rotating twin screw extruder equipped wth two injection ports and a vacuum devolatilization unit. In the first injection port was added maleic anhydride (2.5% by weight based on the polymer feed rate). Through the second injection port was added a 50/50 mixture of mineral oil and 2,5-dimethyl-2,5-di(t-butylperoxy)hexane (Lupersol 101 from Pennwalt, 0.25% by weight based on polymer feed rate). The melt temperature of the polymer reached 280° C. and the extruder screw speed was 200 RPM.

To prepare the polymer for analysis, the modified block copolymer was dissolved in tetrahydrofuran, coagulated into isopropanol, and then washed with water. The modified polymer sample was analyzed for bound maleic anhydride content. The star polymer was found to contain 2.0% by weight maleic anhydride.

The modified block copolymer was blended at 20% by weight loading with the PBT polyester of Example 1 in a 33mm Werner-Pfleiderer twin screw extruder. The extruder screw speed was 300 RPM and the melt temperature reached was from 305°–312° C. for the various blends. Pellets from the resulting blend were injection molded into test specimens on a 25 ton/1.5 oz. Arburg injection molding machine. Each of the blends was tested for its impact strength (ASTM D-256) at room temperature (RT) and at low temperatures and tested for its flexural modulus (ASTM D-790). Table 1 gives the test results for comparison of Example 2c with Example 1 of the present invention.

EXAMPLE 3 (Comparison)

A linear block copolymer having 70% by weight styrene-butadiene-styrene (S-B-S) and 30% by weight styrene-butadiene (S-EB) was conventionally prepared by polymerizing blocks of styrene having a peak molecular weight of 5,300 and blocks of butadiene having a peak molecular weight of 36,500, coupling 70% of the living polymers with methyl benzoate, and hydrogenating the polymerized butadiene. The residual unsaturation of the polymer was reduced to less than 2% of the original aliphatic unsaturation.

The linear block copolymer was processed on a 25mm Berstorff co-rotating twin screw extruder connected to a vacuum devolatilization unit. Prior to addition to the feed throat of the extruder, the polymer was tumbled with 3.0% by weight of glycidal acrylate and 0.2% by weight of the peroxide (Lupersol 101). The melt temperature of the extruder was 232° C., and the extruder screw speed was 300 RPM. The modified polymer was found to contain 2.4%w of glycidal acrylate.

The modified block copolymer was blended at 20% by weight loading with the PBT polyester of Example 1 in a 25mm Berstorff co-rotating twin screw extruder. The extruder screw speed was 300 RPM and the melt temperature reached was 292° C. for the blend. Pellets from the resulting blend were injection molded into test specimens on a 25 ton/1.5 oz. Arburg injection molding machine. Each of the blends was tested for its impact strength (ASTM D-256) at room temperature (RT) and at low temperatures and tested for its flexural modulus (ASTM D-790). Table 1 gives the test results for comparing Example 3c to Example 1 of the present invention.

EXAMPLE 4 (Comparison)

A linear block copolymer having the structure butadiene-styrene (S—B—S) was conventionally prepared by polymerizing blocks of styrene having a peak molecular weight of 7,500, blocks of butadiene having a peak molecular weight of 35,000, and blocks of styrene having peak molecular weights of 7,500, and then hydrogenating the polymerized butadiene. The residual unsaturation of the polymer was reduced to less than 2% of the original aliphatic unsaturation.

The linear block copolymer was processed on a 25mm Berstorff co-rotating twin screw extruder connected to a vacuum devolatilization unit. Prior to addition to the feed throat of the extruder, the polymer was tumbled with 3.0% by weight of glycidal acrylate and 0.2% by weight of the peroxide (Lupersol 101). The melt temperature of the extruder was 241° C., and the extruder screw speed was 300 RPM. The modified polymer was found to contain 2.2%w of glycidal acrylate.

The modified block copolymer was blended at 20% by weight loading with the PBT polyester of Example 1 in a 25mm Berstorff co-rotating twin screw extruder. The extruder screw speed was 300 RPM and the melt temperature reached was 298 C for the blend. Pellets from the resulting blend were injection molded into test specimens on a 25 ton/1.5 oz. Arburg injection molding machine. Each of the blends was tested for its impact strength (ASTM D-256) at room temperature (RT) and at low temperatures and tested for its flexural modulus (ASTM D-790). Table 1 gives the test results for comparing Example 4c to Example 1 of the present invention.

The results in Table 1 show that toughening of PBT with a star polymer grafted with an epoxy containing compound (Example 1) leads to improved low temperature impact strength in comparison to either blends containing the maleated star polymer (Example 2c) or linear block copolymers containing glycidal acrylate (Examples 3c and 4c).

I claim:

1. A toughened polyester composition comprising:
   from 10% to 40% by weight of a modified block copolymer comprising at least 95% by weight of a hydrogenated conjugated diene and a star structure; and
   from 60% to 90% by weight of a polybutylene terephthalate polyester;
   wherein the modified block copolymer comprises an effective amount of a grafted compound having alpha-beta ethylenic unsaturation and at least one epoxy group to give the polyester composition a ⅛" notched Izod impact strength of at least 10 ft-lb/in as determined by ASTM-D256 at −20° C.

2. The composition of claim 1, wherein the modified block copolymer has at least 10 arms of the hydrogenated conjugated diene connected by a block of divinyl benzene and each arm has a block of the conjugated diene with a peak molecular weight from 15,000 to 50,000.

3. The composition of claim 1, wherein the modified block copolymer comprises from 1.5 to 5 percent by weight of the grafted compound having alpha-beta unsaturation and at least one epoxy group, and wherein the grafted compound is glycidal acrylate.

4. The composition of claim 1, wherein the hydrogenated conjugated diene has a residual unsaturation less than 2%.

5. The composition of claim 1, wherein the conjugated diene is isoprene.

6. A toughened polyester composition comprising:
   from 15% to 30% by weight of a modified block copolymer comprising a structure:

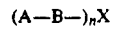

(A—B—)$_n$X wherein A is an optional block of polystyrene on one or more arms having a peak molecular weight less than 15,000, B is a block of hydrogenated isoprene having a peak molecular weight from 15,000 to 50,000, n is at least 10, and X is a block of divinylbenzene; and
   from 70% to 85% by weight of a polybutylene terephthalate polyester having a number average molecular weight from 25,000 to 50,000;
   wherein the modified block copolymer comprises a residual unsaturation less than 2% and an effective amount of grafted glycidal crylate to give the polyester composition a ⅛" notched Izod impact strength of at least 14.0 ft-lb/in or greater as determined by ASTM-D256 at −20° C.

7. The composition of claim 6, wherein the hydrogenated polyisoprene arms have a peak molecular weight of 35,000 and the modified block copolymers do not contain styrene.

8. The composition of claim 7, wherein the modified block copolymer comprises from 1.5 to 5 percent by weight of the glycidal acrylate.

* * * * *